Nov. 28, 1967  R. STÄUBLI  3,355,742
RECORDING APPARATUS FOR THE GRAPHIC REPRESENTATION
OF TIME-SEQUENCE CURVES
Filed Aug. 23, 1965  3 Sheets-Sheet 1
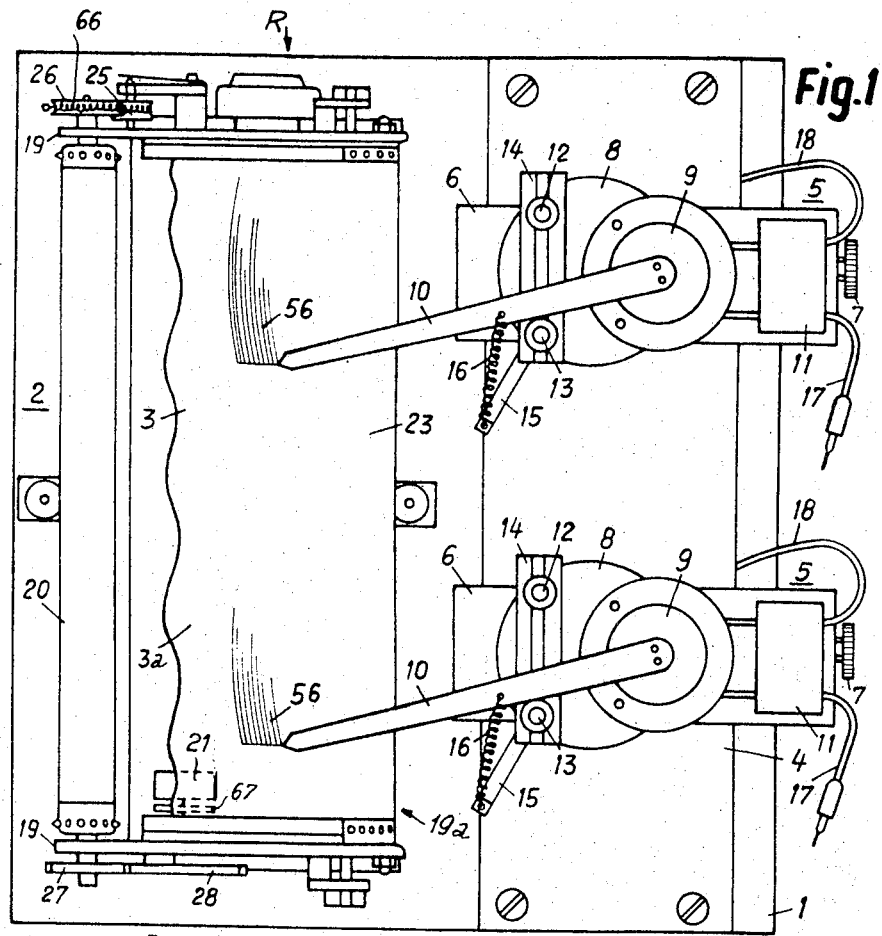
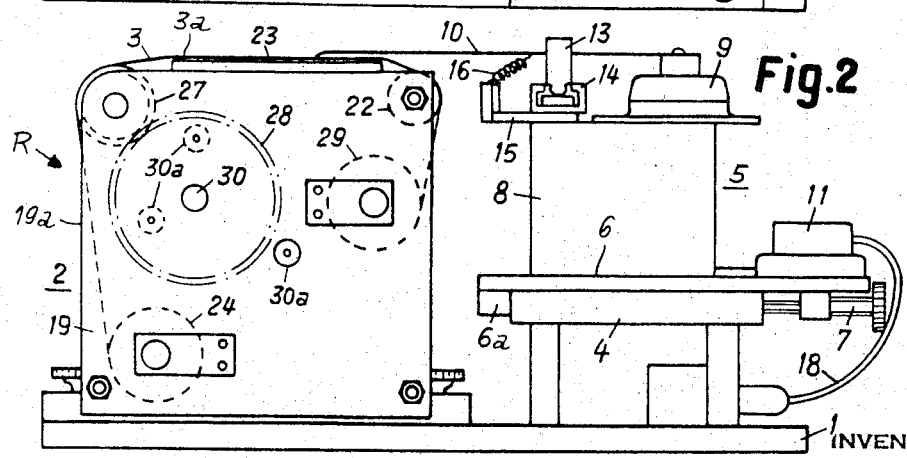
INVENTOR
Rudolf Stäubli
BY Werner W. Kleeman
Attorney

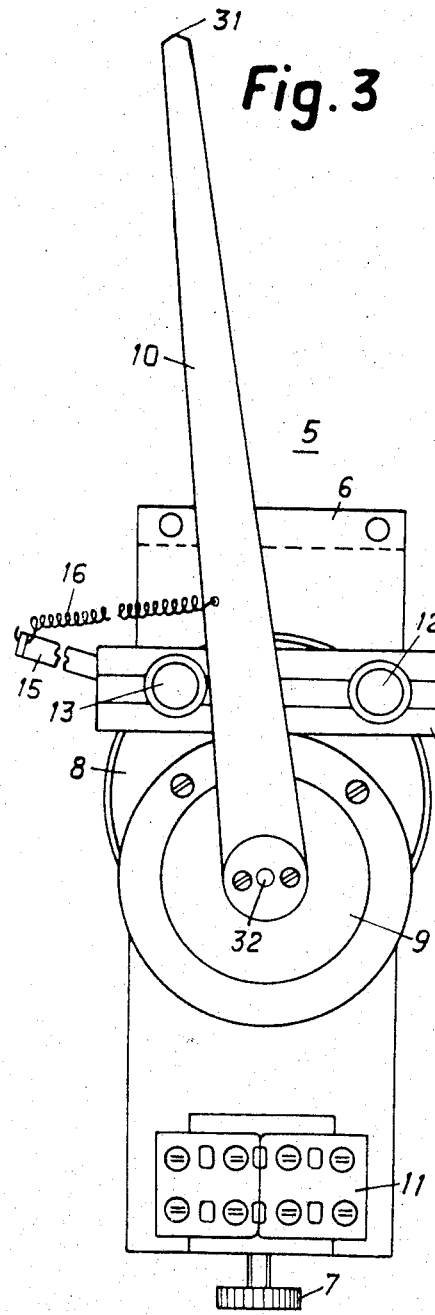
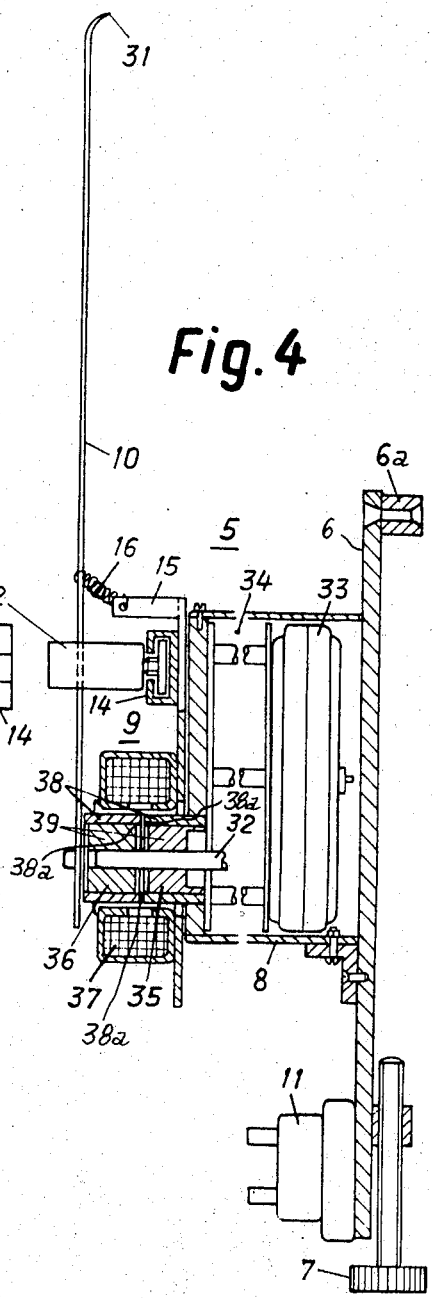

Nov. 28, 1967  R. STÄUBLI  3,355,742
RECORDING APPARATUS FOR THE GRAPHIC REPRESENTATION
OF TIME-SEQUENCE CURVES
Filed Aug. 23, 1965  3 Sheets-Sheet 3

INVENTOR
Rudolf Stäubli
BY Werner W. Kleeman
Attorney

United States Patent Office 3,355,742
Patented Nov. 28, 1967

3,355,742
RECORDING APPARATUS FOR THE GRAPHIC REPRESENTATION OF TIME-SEQUENCE CURVES
Rudolf Stäubli, Frohburgstrasse 88,
Zurich, Switzerland
Filed Aug. 23, 1965, Ser. No. 481,495
Claims priority, application Switzerland, Aug. 25, 1964,
11,118/64
17 Claims. (Cl. 346—49)

The present invention has reference to an improved recording or writing apparatus for the graphic representation or plotting of time-sequence curves and is of the type incorporating a recording instrument for evaluating electric impulses and mechanism for transporting a record or information carrier. Under the term time-sequence curves as employed herein there is to be understood diagrams of succeeding lines which are transverse to the propelling direction of a record carrier e.g. chart or paper and the length of which is proportional to time.

An apparatus for plotting such time-sequence curves has already been described and claimed in my copending United States application Ser. No. 472,212, filed July 15, 1965, and entitled "Apparatus for Plotting Time-Sequence Curves for Time Study." This invention is specifically concerned with a writing apparatus which can be used in conjunction with the aforementioned apparatus of my co-pending application.

A primary object of the present invention is to provide an improved recording apparatus enabling plotting of time-sequence curves immediately upon the appearance of an impulse or signal and practically without inertia, so that the resulting curves provide directly readable information concerning the values to be plotted.

A further important object of the present invention is to provide an improved recording apparatus which, upon termination of the plotting operation, carries out a practically inertialess and thus immediate return of the recording pen or instrument into its starting position.

Another considerable object of the present invention resides in an improved recording apparatus wherein successively plotted lines from which there is formed the time-sequence curves possess a certain spacing with regard to one another so that these time-sequence curves can already be evaluated during plotting, and such is achieved in that, the feed velocity of the record carrier as well as the recording speed of the recording instrument can be varied within very wide limits.

A further object of this invention relates to an improved recording apparatus for plotting time-sequence curves, wherein different time-sequence curves composed of lines can be plotted upon the same record carrier, and where the lines belonging to a single cycle can be recognized as associated lines in consequence of their same elevational position at the record or information carrier.

The present invention is generally characterized by the features that the writing mechanism possesses a drive motor for driving a writing pen or instrument, between this motor and the writing pen there is operatively connected an electric coupling which can be influenced by impulses. Moreover, the invention contemplates that the writing pen bears against a record carrier which moves uniformly in one direction in such a manner that the deflection and return of the writing pen produces relatively close, adjacently disposed lines representing time, the end points of which form time-sequence curves, and for the return of the writing pen into the starting position there is provided a spring which is arranged at the writing pen.

Other features, objects and advantages of the invention will become more readily apparent by reference to the following detailed description and drawings wherein like reference characters have been used for substantially the same or analogous elements throughout the various embodiments, and in which:

FIGURE 1 is a top plan view of a preferred embodiment of recording or writing apparatus designed according to the teachings of the present invention;

FIGURE 2 is a side view of the recording apparatus depicted in FIGURE 1;

FIGURE 3 is an enlarged top plan view showing details of the writing or recording mechanism employed in the recording apparatus of FIGURE 1;

FIGURE 4 is a vertical sectional view of the writing mechanism depicted in FIGURE 3.

Figure 5:
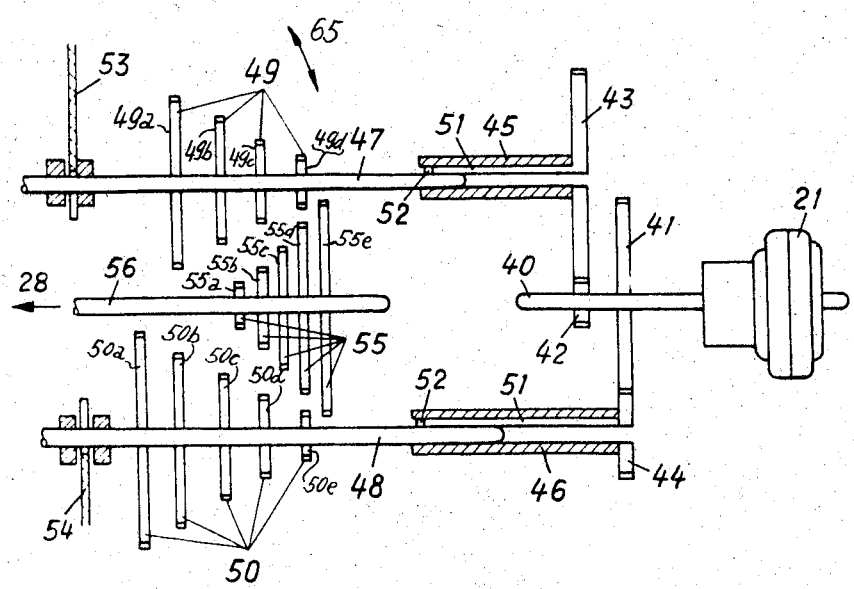
FIGURE 5 schematically illustrates a change-speed gear or transmission capable of being arranged between feed motor and drive shaft of the record carrier employed in the apparatus of FIGURES 1 to 4.

Describing now the drawings, it will be noticed that in FIGURE 1 the exemplary embodiment of recording apparatus R incorporates mechanism 2 for transporting and mounting the record or information carrier 3 and a writing table 4 fixedly arranged with respect to one another upon a base support plate 1. Two recordings or writing mechanism 5 are displaceably arranged upon the writing table 4. More specifically, each recording mechanism 5 is provided at its lower end with a plate 6 having a downwardly extending rib 6a, said plate 6 being supported upon the writing table 4. By means of a clamp screw 7 it is possible to fixedly yet detachably secure each writing or recording mechanism 5 in the desired position at the writing table 4. It is to be clearly understood that in the arrangement of FIGURE 1 it is quite possible to mount more than the two illustrated recording mechanisms 5. The number of such recording mechanisms 5 is dependent upon how many time-sequence curves should be plotted upon the information or record carrier 3 which, for instance, can be a perforated wax paper or chart 3a. Each recording mechanisms 5 incorporates a recording or writing instrument 10 e.g. a pen or equivalent structure which plots lines 56 substantially transversely to the feed direction of the record carrier 3. Lines 56 are disposed close to one another and represent the plotted time. The time-sequence curve is represented by the envelope of the maximum terminal or/and deflection of the lines 56 and can be immediately analysed or evaluated during recording.

Each of the writing or recording mechanisms 5 are similar in construction, so that only the details of a given one need be considered. Thus, such recording mechanism 5 in its essential components comprises a housing 8 in which there is accommodated a suitable drive motor 33 (FIGURE 4), a magnetic coupling 9, a recording or writing pen 10, the connecting terminals or socket 11, and the limit stops 12, 13. The limit stops 12, 13 are advantageously threadably and displaceably arranged upon a guide rail 14. They serve to limit, in desired manner, the null or starting position and the maximum end deflection of the recording or writing pin 10. By referring to FIGURE 1 it will be noticed that a tension spring 16 e.g. a spiral torsion spring, is arranged between the recording pen 10 and a spring-support 15 which serves to return this recording pen 10 back into its starting position. The connection socket or block 11, on the one hand, serves to conduct the impulses coming from an impulse transmitter via the conductor 17 to the magnetic coupling 9 and, on the other hand, guarantees the current supply via a conductor 18 to the drive motor located in the housing 8.

The record carrier feed or transport mechanism 2 embodies two side plates 19 interconnected in a manner to form a housing 19a and at which there is mounted feed or transport roller 20 for the record carrier 3, in this case the paper 3a. A drive or feed motor 21 and the change-speed gear or transmission 65 depicted in FIGURE 5 can be housed in this housing 19a formed by the plates 19. The invention also contemplates using the drive motor 21 for feeding the paper 3a without the change-speed transmission 65. This possibility will be developed more fully later in conjunction with FIGURE 2. The paper 3a upon which the pertinent data or information is recorded, moves from a supply roll 29 accommodated in housing 19a past a deflecting roller 22, a writing surface or undersupport 23, to the paper drive roller 20 and is then wound onto a take-up or wind-up roller 24. As best seen in FIGURE 1, a spiral or helical spring 66 is arranged between a cord pulley 25 secured to the shaft of the take-up roller 24 and a further cord pulley 26 arranged at the transport roller 20. This helical spring 66 ensures that the paper 3a is wound up proportional to its feed movement. A gear 27 is arranged at the other end of the paper transport roller 20 and meshes with a further gear 28. Gear 28 can be seated upon the output shaft of the change-speed transmission 65 which will be described in greater detail during consideration of FIGURE 5, or, as shown in FIGURE 1 where the drive motor 21 is provided with a speed reduction drive 67, is driven by the latter. In this last-mentioned case the possibility exists of using feed motors 21 having different operating speeds, whereby such feed motors can be constructed such that they can be selectively attached or mounted. This facet of the invention will be considered in greater detail during the discussion of FIGURE 2.

In FIGURE 2 there is shown a side view of the arrangement depicted in FIGURE 1. Here, the paper supply roll 29, not visible in FIGURE 1, can be clearly seen. Furthermore, transportation of the paper 3a is carried out over the stationarily mounted deflecting roller 22, the writing support 23, the transport roller 20 and then to the take-up roller 24. In FIGURES 1 and 2, a feed motor 21 has been selected which drives the paper transport roller 20 by means of the gear 28 through the agency of the gear 27. As already explained, in this exemplary arrangement, the feed or drive motor operates without the intermediate connection of the change-speed transmission 65 of FIGURE 5, only a fixed speed reduction unit 67 is employed. It will be observed that at the plate 19 there are shown in broken lines further throughpassage holes or bores 30a for drive shafts of further feed motors 21 possessing different operating speeds. The drive motor or drive motors are mounted to the plate 19 with the aid of two or more non-illustrated guide pins or equivalent fastening structure, so that the drive shaft or shafts of the drive motor or motors piercingly extend out of the plate 19 through the bore 30 and/or 30a. Upon such drive shaft it is possible to mount an appropriate gear 28 so that there is ensured for meshing engagement between this gear 28 and the gear 27. Now, if different feed velocities or speeds are required then appropriate drive motors 21 can be mounted which can additionally change the paper feed velocity by appropriate selection of the gear 28, so that the range of variation of the feed velocity lies between 1 and 10,000 for instance. Assuming, for example, that the paper 3a should possess a feed rate of one millimeter in 0.1 minute then the gears 27 and 28 are selected such that collectively they possess 120 teeth, the gear 27 having 45 teeth and the gear 28 possessing 75 teeth, so that in the appropriate bore or hole 30 or 30a there is inserted the shaft of the drive or feed motor 21. A feed motor 31 must be selected whose shaft performs one revolution in ten minutes.

In FIGURE 3 there is illustrated an enlarged top plan view of one of the writing or recording mechanisms 5 of the recording apparatus R of FIGURE 1. Since a great many of the components of this writing or recording mechanism 5 have already been considered, there will now only be stressed the importance of the return spring 16 and the limit stops 12 and 13. It will be noticed that the return spring 16 is connected at one end to the writing instrument e.g. pen 10 and at its other end to the spring support 15. This support 15 is, for instance, located a certain distance beneath the plane of movement of the writing pen 10. Such is advantageous for the reason that there is thus available a certain tension component which presses the tip 31 of the writing pen 10 with sufficient pressure against the record carrier 3 and also causes friction between the entrainment means of the coupling 9 in its rest condition, for the purpose to be explained in conjunction with the next figure. This arrangement ensures that the tension spring 16 returns the writing pen 10 from its maximum or end deflection at the limit stop 12 to the null or starting position at the limit stop 13, and specifically, within the shortest time, namely in the range of about $1/100$ to $5/100$ second. The writing tip 31 can be a writing pen provided with ink for instance. In such case, it is advantageous if the ink reservoir is arranged above the axis of rotation (upper portion of the coupling shaft 32 of FIGURE 4), and between the non-illustrated ink supply reservoir there is then arranged a capillary feed to the pen tip 31. In FIGURE 3, the pen tip 31 is of the type assumed to be only equipped for engraving upon wax paper.

FIGURE 4 is a cross-sectional view of the writing or recording mechanism 5 previously considered. By inspecting this figure, it will be recognized that in its housing 8 there is arranged a small drive motor 33 which acts via a schematically represented transmission or speed reduction drive 34 upon a coupling drive shaft 32. The individual recording mechanisms 5 can be equipped with drive motors 33 possessing different operating speeds. Furthermore, there exists the possibility of obtaining speeds in the range of 1:1000 with the aid of different exchangeable speed reduction transmissions or drives 34 for the coupling drive shaft 32. In this way, there are available recording mechanisms 5 possessing different operating speeds. For the plotting of time-sequence curves it has proven to be advantageous if, for instance, the writing pen 10 plots one centimeter in $1/100$ minute, or $1/10$ minute, or one minute. In so doing, there have been selected, for instance, drive motors 33 with appropriate speed reduction drives 34, wherein the coupling drive shaft 32, upon which the writing pen 10 is stationarily arranged, performs one revolution in one minute, or in ten minutes, or in one hundred minutes.

The magnetic coupling 9 incorporates two entrainment means or coupling portions, specifically the drive coupling portion or entrainment means 35 and the writing pen coupling portion or entrainment means 36. A solenoid 37 is located about both of these entrainment means 35, 36. Each entrainment means 35 and 36 is composed of a magnetic e.g. steel cylinder 38 filled with a non-magnetic e.g. brass core 39. In the case of the drive coupling portion or entrainment means 35 the brass core 39 is fixedly connected with the drive shaft 32. In the case of the writing pen coupling portion or entrainment means 36 the brass core 39 possesses a certain play with respect to the coupling drive shaft 32. Furthermore, the entrainment means 36 bears with play upon the entrainment means 35. Now, if the magnetic coupling 9 is placed into operation due to switching-in of the solenoid 37 by an impulse arriving from the conductor 17, then magnetic coupling forces appear between the oppositely situated plane ground surfaces 38a of the steel cylinder 38 of both entrainment means 35, 36, so that the continuously rotating entrainment means 35 transmits its rotational movement to the entrainment means 36 and, thus, the writing pen 10. Only upon termination of the impulse is the magnetic coupling between these entrainment means 35, 36 released.

When the writing pen 10 has arrived at the limit stop 12 and the magnetic coupling 9 is still effective due to continuance of the impulse, then the writing pen 10 remains in this terminal position due to the coupled relationship of the contact surfaces 38a of the steel cylinders 38 of both entrainment means 35, 36, even though the return spring 16 exerts its full force at the writing pen 10. Only after switching-out the impulse arriving via the conductor 17 does the return spring 16 retract the writing pen 10 into the starting position against the limit stop 13. The arrangement of the writing pen 10 and the entrainment means 35, 36 is selected such that no large masses must be returned. For this reason, the diameter of the cylinders 38 of the entrainment means 35, 36 is held small, the mass of the writing pen 10 also as small as possible. By inspecting FIGURE 4 it will be readily apparent, and as already previously mentioned, due to the particular mounting of the return spring 16 at the writing pen 10 and the support 16, a downwardly acting tension component appears at the writing pen 10 whereby also friction between the steel cylinders 38 of both entrainment means 35, 36 is available at their contact surfaces 38a. This is then of particular importance when the writing pen 10 is located in starting or rest position at its limit stop 13. Due to this measure there is namely achieved that a certain return or load force is always available at the coupling drive shaft 32 via the entrainment means 35, so that the gears of the exchangeable speed reduction drive or transmission 34 are continuously in power meshing engagement with one another. As a result, the advantage exists that when the coupling 9 is switched-in, the writing pen begins to write without delay. Simultaneously, and by virtue of the special mounting of the return spring 16, there is also achieved that the writing tip 31 bears with sufficient pressure upon the record or information carrier 3.

In FIGURE 5 there is schematically depicted a change-speed gear or transmission 65 which is arranged between the feed motor 21 and the output gear 28 of FIGURE 1. For the sake of simplicity in illustration the change-speed transmission 65 is depicted in one plane; in reality, the drive motor 21 is located beneath the plane of the paper. This drive or feed motor 21 drives a shaft 40 upon which are arranged two gears 41 and 42 having different numbers of teeth. These gears 41 and 42, in turn, act upon further gears 44 and 43 respectively, fixedly mounted upon a respective bushing or sleeve 46 and 45. The shafts 47 and 48 move within such bushings 45 and 46 respectively, and they are each equipped with a respective group 49 and 50 of different gears 49a to 49d and 50a to 50e respectively. Shafts 47 and 48 are arranged in the sleeves or bushings 45 and 46 respectively, in such a manner that they are freely axially displaceable therein in two directions, yet due to a respective groove 51 provided in each such bushing 45 and 46 and with which engages a guide pin 52 fixedly mounted to each of the shafts 47 and 48, the latter are also rotatably entrained in the direction of rotation of the associated bushings 45 and 46. These shafts 47 and 48 are displaced in both axial directions by means of conventional control or switching levers 53 and 54 respectively, so that the individual drive gears 49a to 49d and 50a to 50e can selectively be brought into operable driving relationship with the corresponding drive gears 55a to 55e of the gear group 50 arranged at the drive shaft 56. Both of the control levers 53 and 54 are preferably united into a manual or hand-operated lever (not shown) via an appropriate clamp connection. In so doing, there is ensured that, in each case, only one cooperating group of gears 49, 55 or 50, 55 of the change-speed gear 65 come into the desired meshing engagement.

Regulation of the desired speed for the feed of the paper 3a via the feed roller 20 and the power for which is tapped-off at the drive shaft 56 occurs such that with the aid of the hand-operated lever which can be mounted at the rear of the transport mechanism 2, a first movement thereof places the change-speed transmission 65 into its inoperative position, with a second movement the desired groups of gears 49 or 50 are selected, and with a third movement a definite selection is made such that a desired pair of gears of the groups 49 and 55 or 50 and 55 come into engagement.

There will now be given an illustrative example of the operation of the described drive system. If, for example, a feed velocity of the record carrier 3 of one millimeter in 0.2 minute is required and the circumference of the paper feed roller 20 amounts to 60 millimeters, then there results one revolutoin of feed roller 20 in 12 minutes. Now, if a transmission ratio of 1:2 exists between the gears 28 and 27 then the drive shaft 56 of the change-speed transmission 65 must perform one revolution in six minutes. This means that with the second movement of the manual lever the second gear 49b at the left of the gear group 49 is located opposite the third gear 55c to the left of the gear group 55 and, likewise the third gear 50c at the left of the gear group 50 is dispositioned opposite the third gear 55c at the left of the gear group 55. With the third movement of this manual lever there is selected the desired driving connection between the relevant gear pairs of these groups, in this case assumed to be groups 55 and 50. This means that with the desired previously pre-given values, the shaft 48 performs one revolution in six minutes since the drive shaft 40 of the drive motor 21 makes one revolution in 24 minutes, whereby the transmission ratio between the drive shaft 40 and the sleeve 46 via the meshing gears 41, 44 is 1:4.

With the aid of the inventive recording apparatus described in conjunction with FIGURES 1 to 5 it is possible to successively plot lines 56, the maximum end points of which represent a time-sequence curve. However, such is only possible since these lines 56 in their sequential arrangement exhibit a spacing of 0.3 to 2 millimeters. This is obtained in that the feed velocity of the paper 3a can be varied within very wide limits: on the one hand with the different insertable or detachably mountable type feed motors 21 (FIGURES 1 and 2), and furthermore, by the possible intermediate connection of a change-speed gear or transmission (FIGURE 5). Furthermore, the recording speed of the writing pen 10 can be varied within very wide limits. This occurs by providing an appropriate number of recording or writing mechanisms 5, each writing instrument 10 thereof incorporating a motor 33 and a speed reduction drive 34 imparting a certain desired rotation to the coupling drive shaft 32.

Finally, it is mentioned that the non-magnetic core 39 of the coupling portion 36 is carried upon the coupling drive shaft 32 with play sufficient to enable the quick and relatively frictionless return of the writing instrument 10 back into its starting position, yet such play prevents the outer wall of the magnetic cylinder 38 encircling the aforesaid core 39 from contacting the solenoid 37 of the electric coupling 9.

While there is shown and described present preferred embodiments of the invention it is to be distinctly understood that the invention is not limited thereto but may be otherwise variously embodied and practised within the scope of the following claims.

What is claimed is:

1. Recording apparatus for the graphic representation of time-sequence curves comprising a record carrier, transport means for continuously conveying said record carrier with substantially uniform feed movement in a given direction, at least one writing mechanism capable of being actuated by electric signals for plotting upon said record carrier time-sequence curves composed of line markings in dependency of the electric signals, said writing mechanism incorporating a writing instrument cooperating with said record carrier for applying said line markings thereto, a drive motor for displacing said writing instrument, an electric coupling actuated by the electric signals for the transmission of power from said drive motor to said writing instrument, means for returning said writing instrument into its starting position, said writing instrument bearing upon said record carrier in a manner that when said electric coupling operably connects said drive motor with said writing instrument the deflection and return movements of said writing instrument form relatively closely arranged line markings upon said record carrier, the length of which is proportional to time and the end points of which define a time-sequence curve, said recording apparatus further including a shaft member driven by said drive motor, said electric coupling being an electromagnetic coupling incorporating at least two movable coupling portions, one coupling portion being fixedly connected with said shaft member, the other coupling portion being carried with play upon said shaft member, and means for generating a load upon said shaft member when said coupling portions are in their rest position.

2. Recording apparatus as defined in claim 1 wherein both of said coupling portions are of substantially cylindrical configuration.

3. Recording apparatus as defined in claim 1 wherein said writing instrument is directly fixedly connected with said other coupling portion carried with play upon said shaft member, the weight of said writing instrument and the dimensions of said other coupling portion are such that they possess as small as possible moment of inertia so that the return movement of said writing instrument into its starting position takes place extremely quickly.

4. Recording apparatus as defined in claim 3 wherein said return movement of said writing instrument occurs within about $1/100$ to $5/100$ second.

5. Recording apparatus as defined in claim 1 wherein said electromagnetic coupling further includes a solenoid, each coupling portion comprising an outer magnetic cylinder and a nonmagnetic core located within said cylinder, said nonmagnetic core of said other coupling portion being carried upon said shaft member with play sufficient to enable the quick and relatively frictionless return of said writing instrument into its starting position, yet such play prevents the outer wall of said magnetic cylinder from contacting said solenoid of said electromagnetic coupling.

6. Recording apparatus as defined in claim 1 further including a speed reduction gear unit operably interposed between said drive motor and said electric coupling, and wherein said means for generating a load upon said shaft member further includes means for generating friction between both said coupling portions in their rest position in order that said speed reduction gear unit is always under load so as to prevent its gear teeth from having play.

7. Recording apparatus as defined in claim 6 wherein said means for generating friction is defined by a spring member providing said returning means for said writing instrument, one end of said spring member being fixed to said writing instrument, a support to which the other end of said spring member is fixed, said support being located in a position such that the points of fixing of the respective ends of said spring member lie in different planes spaced from one another a distance which ensures that said speed reduction gear unit is devoid of play at its gear teeth and that there is available the necessary writing pressure between said writing instrument and said record carrier, yet that said friction generated between both said coupling portions in their rest position does not prevent the relatively quick return movement of said writing instrument.

8. Recording apparatus as defined in claim 1 wherein each of said coupling portions incorporates an outer magnetic cylinder having confronting coupling surfaces, said coupling surfaces ensuring for the slip-free entrainment of said writing instrument and for stopping the latter free of vibration in its one terminal deflected position.

9. Recording apparatus as defined in claim 8 further including limit stops for limiting the movement of said writing instrument in both terminal positions defined by said starting position and said one terminal deflected positon, a guide rail, said limit stops being freely displaceably arranged at said guide rail in order to permit adjustment of the desired plotting range of said writing instrument upon said record carrier.

10. Recording apparatus as defined in claim 1 further including a writing table disposed substantially perpendicular to said given direction of feed movement of said record carrier, and means for detachably and displaceably mounting said writing mechanism at said writing table.

11. Recording apparatus as defined in claim 1 further including a writing table disposed substantially perpendicular to the given direction of feed movement of said record carrier, a plurality of writing mechanisms possessing different writing speeds arranged upon said writing table, so that the time-span to be measured can be varied in a ratio of 1:1000.

12. Recording apparatus as defined in claim 1 further including an exchangeable speed reduction gear unit operably disposed between and cooperating with said drive motor and said electric coupling.

13. Recording apparatus as defined in claim 1 wherein said returning means for said writing instrument comprises a tension spring having one end fixed to said writing instrument, a spring support to which the other end of said tension spring is connected.

14. Recording apparatus as defined in claim 1 wherein said returning means comprises a helical torsion spring.

15. Recording apparatus as defined in claim 1 wherein said transport means for continuously conveying said record carrier comprises a feed roller, a drive motor operatively connected with said feed roller, and a change-speed transmission operably located between and cooperating with said feed roller and said drive roller for enabling selective adjustment of the feed velocity of said record carrier.

16. Recording apparatus as defined in claim 1 wherein said transport means incorporates a housing, a feed roller arranged at said housing for rotation about a given axis of rotation in order to convey said record carrier, an exchangeable drive motor for said feed roller having a drive shaft possessing a fixed rotational speed detachably mounted at said housing, said drive shaft having a certain desired spacing from said axis of rotation of said feed roller.

17. Recording apparatus as defined in claim 1 wherein said transport means incorporates a housing, a feed roller arranged at said housing for rotation about a given axis of rotation in order to convey said record carrier, a plurality of exchangeable drive motors for said feed roller each having a drive shaft possessing a fixed rotational speed and capable of being selectively detachably mounted at said housing, each exchangeable drive motor being positionable at said housing such that its drive shaft may have several different spacings from said axis of rotation of said feed roller.

References Cited
UNITED STATES PATENTS

| | | | |
|---|---|---|---|
| 1,412,586 | 5/1919 | Welch | 346—13 |
| 2,565,951 | 8/1951 | Crookston et al. | 73—151.5 |
| 2,847,866 | 8/1958 | Thurmond | 346—136 |

RICHARD B. WILKINSON, *Primary Examiner.*

MICHAEL LORCH, *Assistant Examiner.*